United States Patent
Fang et al.

(12)

(10) Patent No.: US 6,185,715 B1
(45) Date of Patent: Feb. 6, 2001

(54) METHOD OF PRODUCT CODE BLOCK ENCODING APPLICABLE TO ENCODING AN ATM CELL

(75) Inventors: Juing Fang, Levallois; Fabien Buda, Paris, both of (FR)

(73) Assignee: Alcatel, Paris (FR)

( * ) Notice: Under 35 U.S.C. 154(b), the term of this patent shall be extended for 0 days.

(21) Appl. No.: 09/166,234

(22) Filed: Oct. 5, 1998

(30) Foreign Application Priority Data

Oct. 9, 1997 (FR) .................................................. 97 12594

(51) Int. Cl.$^7$ .................................................. H03M 13/00
(52) U.S. Cl. ........................... 714/755; 714/782; 714/793
(58) Field of Search .................................... 714/753, 755, 714/752, 756, 793, 781, 782, 701, 807, 809, 810

(56) References Cited

U.S. PATENT DOCUMENTS

| 5,392,299 | * | 2/1995 | Rhines et al. ......................... 714/756 |
| 5,537,429 | * | 7/1996 | Inoue .................................... 714/755 |
| 5,898,708 | * | 4/1999 | Tateishi et al. ....................... 714/781 |

FOREIGN PATENT DOCUMENTS

0 603 932 A1  6/1994  (EP) .

OTHER PUBLICATIONS

S. Aikawa et al, "Forward Error Correction Schemes for Wireless ATM Systems", 1996 IEEE International Conference on Communications (ICC), Dallas, US, vol. 1, 23–27 Jun. 1996, Institute of Electrical & Electronic Engineers, pp. 454–458.

R. Iwase et al, "A Bit Error and Cell Loss Compensation Method for ATM Transport Systems", Electronics & Communications in Japan, Part I– Communications, vol. 76, No. 3, Mar. 1993, pp. 16–30.

\* cited by examiner

*Primary Examiner*—Christine T. Tu
(74) *Attorney, Agent, or Firm*—Sughrue, Mion, Zinn, Macpeak & Seas, PLLC

(57) ABSTRACT

The invention relates to a method of encoding a data block comprising first and second zones, the method being of the type consisting in applying product encoding to the block. It comprises first block encoding applied to the first zone, second block encoding applied to the second zone, and third block encoding applied to the data obtained by the first two encodings, but in a direction orthogonal to the first two codes, the three encodings being performed using BCH codes, the first zone being protected by a code that is more powerful than the second zone. The block is constituted by an ATM cell, the first zone corresponding to the header of the ATM cell, and the second zone corresponding to the payload data field of said ATM cell.

7 Claims, 4 Drawing Sheets

FIG_1

| d1 | d2 | d3 | d4 | d5 | d6 | d7 | d8 | d9 | d10 |
|---|---|---|---|---|---|---|---|---|---|
| d11 | d12 | d13 | ... | | | | | | |
| d21 | ... | | | | | | | | |
| d31 | ... | | | | | | | | |
| d41 | ... | | | | | | | | |
| d51 | ... | | | | | | | | |
| d61 | ... | | | | | | | | |
| d71 | ... | | | | | | | | |
| d81 | ... | | | | | | | | d90 | k1, k2

FIG_2

| d1 | d2 | d3 | d4 | d5 | d6 | d7 | d8 | d9 | d10 | d11 | d12 | d13 |
|---|---|---|---|---|---|---|---|---|---|---|---|---|
| d11 | d12 | d13 | ... | | | | | | | d14 | ... | |
| d21 | ... | | | | | | | | | | | |
| d31 | ... | | | | | | | | | | | |
| d41 | ... | | | | | | | | | | | |
| d51 | ... | | | | | | | | | | | |
| d61 | ... | | | | | | | | | | | |
| d71 | ... | | | | | | | | | | | |
| d81 | ... | | | | | | | | d90 | | | dl27 |
| dc1 | dc3 | dc5 | ... | | | | | | dc19 | dlc1 | dlc3 | dlc5 |
| dc2 | dc4 | ... | | | | | | | dc20 | dlc2 | dlc4 | dlc6 | k1, k2, n1, n2

FIG_3
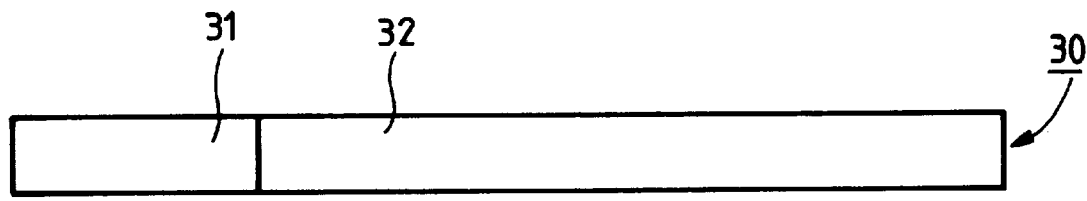

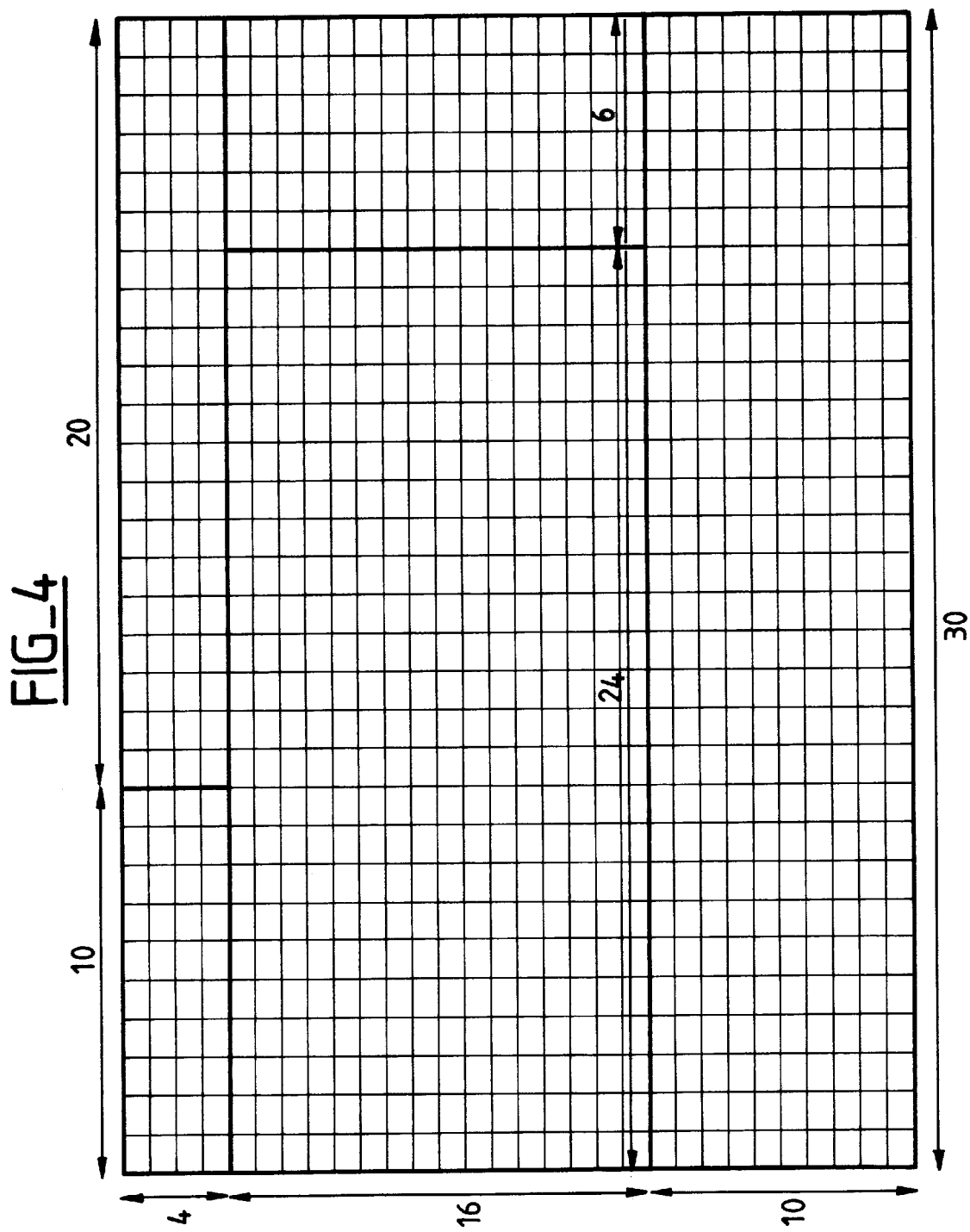

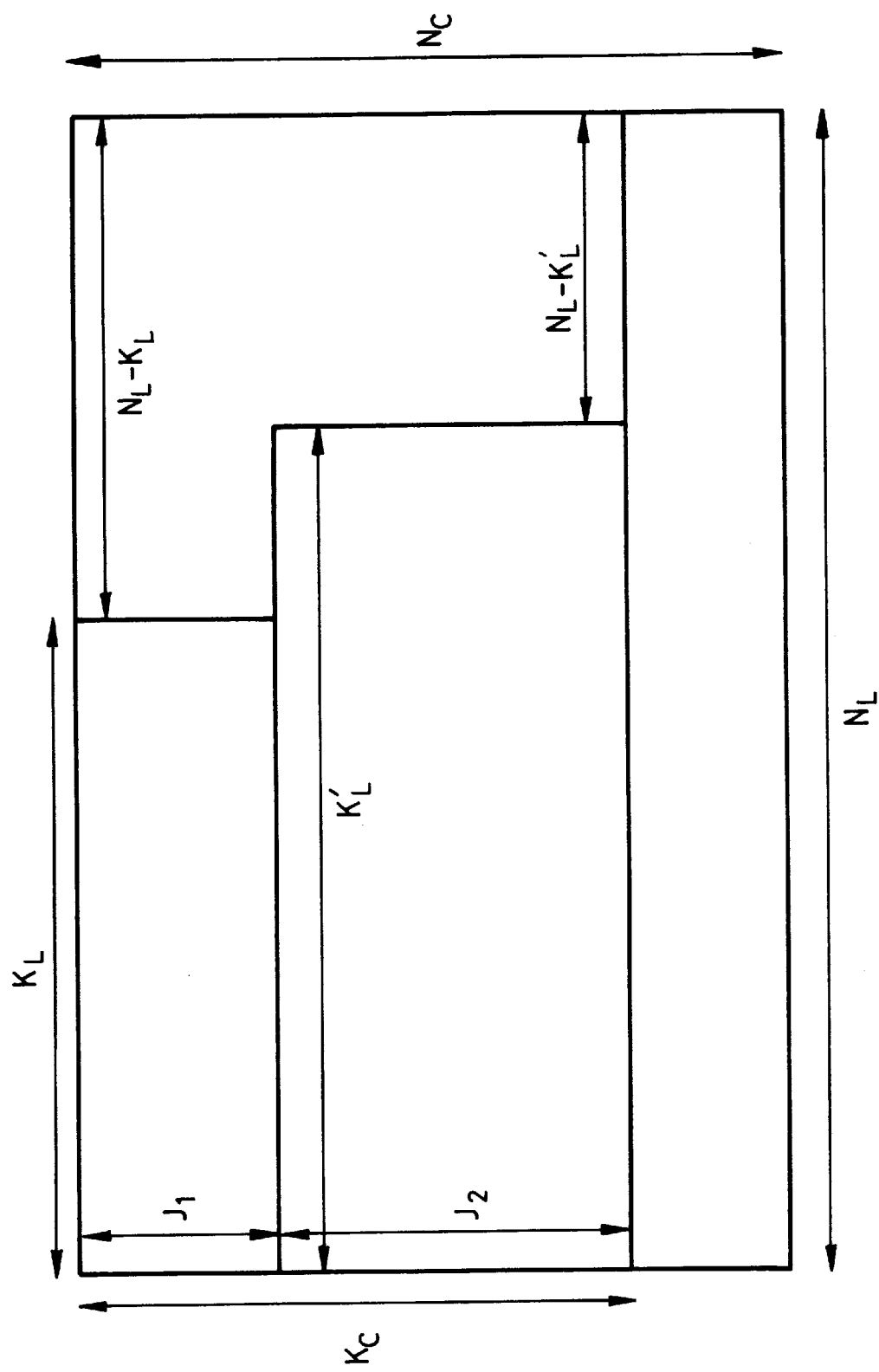
FIG_5

METHOD OF PRODUCT CODE BLOCK ENCODING APPLICABLE TO ENCODING AN ATM CELL

FIELD OF THE INVENTION

The field of the invention is that of encoding data. More precisely, the present invention relates to a method enabling data blocks to be encoded, each block comprising at least a first zone and a second zone, e.g. a header and a zone of payload data. The invention applies particularly to encoding asynchronous transfer mode (ATM) cells.

BACKGROUND OF THE INVENTION

Product code encoding is a known encoding technique that enables data to be encoded for transmission, e.g. by radio. FIGS. 1 and 2 show the principle of product encoding.

In this case a block of 90 bits is to be encoded, wherein the bits are referenced d1 to d90. The bits are organized on a table as shown in FIG. 1, the table comprising a number k1=9 of rows and a number k2=10 of columns. Product code encoding consists in applying first block encoding (referred to as row encoding) to each of the k1 rows so as to obtain additional bits referenced dli (FIG. 2) corresponding to encoding each of the k1 rows. By way of example, the bits dl1, dl2, and dl3 correspond to encoding the bits d1 to d10. As a function of the kind of block encoding scheme used, this gives rise to k1×n2 additional bits (in this case n2=3). These bits are placed after the bits from which they are derived, thus obtaining a table that has k1 rows and k2+n2 columns.

After this first encoding operation, a second kind of block encoding (known as column encoding) is applied to the k2+n2 columns, so as to generate n1×(k2+n2) additional bits. In FIG. 2, 20 additional bits (dci) are thus generated by encoding the k2 columns, and 6 more additional bits (dlci) are obtained by encoding the n2 columns. In this case the value of n1 is equal to 2. By way of example, the encoding of the bits in the first column of the table in FIG. 1 gives rise to bits dc1 and dc2.

A product code is defined on the basis of the parameters (n1, k1) and (n2, k2) of the row and column codes.

When transmitting ATM cells, it is desirable for the header to be better protected than the payload data field since the header comprises, in particular, the destination address for the cell. If the address is severely degraded on transmission, the packet as transmitted not only fails to arrive at its destination, but it is no longer possible to warn the destination that a packet intended for it has not arrived. Furthermore, when the packet reaches an unknown node, the routing system is disturbed.

A particular object of the present invention is to remedy those drawbacks.

SUMMARY OF THE INVENTION

The present invention provides a method of encoding ATM cells that are to be transmitted, e.g. by radio, said method enabling the cell header to be given better protection than its payload data field.

This object and others that appear below are achieved by a method according to claim 1.

BRIEF DESCRIPTION OF THE DRAWINGS

Other characteristics and advantages of the invention appear on reading the following description of a preferred implementation, given by way of non-limiting illustration, and with reference to the accompanying drawings, in which:

FIGS. 1 and 2 show the principle of product encoding;

FIG. 3 shows an ATM cell;

FIG. 4 shows the encoding principle of the invention applied to an ATM cell; and FIG. 5 shows how the encoding method of the invention can be generalized to ATM cells containing various numbers of bits.

DETAILED DESCRIPTION OF THE PREFERRED EMBODIMENTS

FIGS. 1 and 2 are described above with reference to the state of the art.

FIG. 3 shows an ATM cell referenced 30. The cell 30 comprises a header 31 containing 40 bits (5 bytes) and a payload data field 32 containing 384 bits (48 bytes). The 5 header bytes comprise six fields including a cyclic redundancy check (CRC) byte, generally referred to as header error control (HEC).

FIG. 4 shows the encoding principle of the invention as applied to an ATM cell.

The invention proposes reinforcing the encoding of the header 31 of the ATM cell compared with the encoding of its payload data by applying different kinds of encoding to these two zones. More precisely, the 40 bits of the header are placed in a zone that is strongly protected by $C(N_L, K_L')$ row encoding while the 384 payload data bits are placed in another zone that is protected less strongly by $C(N_L, K_L')$ row encoding. After the two kinds of row encoding have been applied, $C(N_C, K_C)$ column encoding is applied to all of the columns of the matrix. As explained below, it is preferable for the $C(N_L, K_L)$ encoding to be a sub-code of the $C(N_L, K_L')$ encoding.

By way of example, as shown in FIG. 4, the 40 header bits are placed in 4 rows of 10 columns each, while the 384 payload data bits are placed in 16 rows of 24 columns each.

Thereafter, the first step of the method, referred to as step a, consists in applying first row block encoding to the header bits, said first block encoding being Bode-Chaudhuri-Hocquenghem (BCH) encoding of the (30, 10) type. Thus, for each 10-bit word, 20 code bits are obtained which are placed after said 10-bit word (in a 4×20 matrix). The second step of the method, referred to as step b, consists in applying second row block encoding, in this case of the (30, 24) type, to the sixteen 24-tuplets of payload bits, thereby obtaining 16×6 code bits following the 24-tuplets. This provides a table of 20 rows and 30 columns.

To perform product encoding, an additional step, referred to as step c, consists in applying third block encoding, in this case a column code, to the data obtained during steps a and b. This third block encoding is of the (20, 30) type in this case and generates 30 10-bit code words.

The final result is thus a table of 30 rows by 30 columns containing not only the source data to be transmitted but also the code bits obtained in steps a, b, and c.

The codes used for constructing the product codes in the present invention are binary BCH codes, and (n, k) binary cyclic codes, their (n+1, k) extents, and their (n, k−1) expurgates, and shortened codes of these (n−s, k−s), (n−s, k−1−s), and (n+1−s, k−s) codes with k, n, and s integers and s<k.

The extended codes are obtained by adding a parity bit to each word of a cyclic code having an odd minimum Hamming distance. In other words, its generator polynomial g(x) does not contain the factor (x+1). An expurgated code is obtained from a cyclic code having g(x) as its generator polynomial, g(x) not containing the factor (x+1). The expurgated code is obtained by the new generator polynomial (x+1)·g(x).

Binary expurgated codes and extended codes have all of their code words of odd length. The expurgated code obtained by (x+1)·g(x) is a sub-code of the code generated by g(x). All of the shortened codes are sub-codes of block linear codes, but an extended code is not a sub-code of its main code.

The C(n, k) code is a sub-code of a C(n, k') code where k<k', if all of the words of the C(n, k) code also belong to the C(n, k') code. With a linear block code, this means that the C(n, k) sub-code is a sub-space of the C(n, k') code. For cyclic codes, the main code C(n, k') has its roots in the set of roots of its C(n, k) sub-code. In other words, if the C(n, k') code is generated by its generator polynomial g(x), the C(n, k) code generated by g(x) is its sub-code if g'(x) divides into g(x) in the $GF(q)/[p_m(x)]$ domain where GF(q) is the symbolic finite Galois body of the C(n, k) and C(n, k') codes, and $p_m(x)$ is the polynomial which defines the finite body in which the roots of the generator polynomials of these cyclic codes are to be found. If this property is satisfied, then all of the rows of the matrix are words of the $C(N_L, K_L)$ main code.

Using the following notation, as shown in FIG. 5:

$J_1$ is the number of rows in the table containing header bits;

$K_L$ is the number of columns in the table containing header bits;

$J_2$ is the number of rows in the table containing payload bits;

$K_L'$ is the number of columns in the table containing payload bits;

$K_C$ is equal to $J_1+J_2$;

$N_L$ is the number of columns in the table after row encoding has been applied in step a and b; and $N_C$ is the number of rows in the table after column encoding has been applied in step c, then: the first row encoding applied is $(N_L, K_L)$ code, this encoding being applied on the $J_1$ rows, the second row encoding applied is $(N_L, K_L')$ code, this encoding being applied on the $J_2$ rows, the column encoding applied is $(N_C, K_C)$ code, this code being applied on the $N_L$ columns.

In this case, the codes used are (31, k) BCH codes, optionally extended (32, k) codes and optionally expurged (31, k−1) codes, and all shortened versions thereof (31−s, k−s), (32−s, k−s), and (31−s, k−s−1) codes, where d is the BCH distance and s is an integer in the range 1 to k−1. The value of k is 6, 11, 16, 21, or 26.

By way of example, (29, 24), and (29, 14) codes are shortened codes of (31, 26) and (31, 16) BCH codes, (29, 8) code is a shortened code of (31, 15) code, and (31, 15) code is an expurgated code of (31, 16) code. Consequently, (29, 14) and (29, 8) codes are sub-codes of (29, 24) code.

The following table shows three different configurations of the codes used as a function of header size.

| Configuration | $K_L$ | $K_L'$ | $K_C$ | $J_1$ | $J_2$ | N | K | R | Byte+ |
|---|---|---|---|---|---|---|---|---|---|
| 1 | 29 | 24 | 8 | 5 | 16 | 899 | 424 | 0.47 | 0 |
| 2 | 29 | 24 | 14 | 4 | 16 | 725 | 440 | 0.61 | 2 |
| 3 | 29 | 24 | 8 | 10 | 16 | 928 | 464 | 0.5 | 5 |

The number N corresponds to the total number of bits after encoding, i.e. $n=N_L \times N_C$, K corresponds to the number of bits in the cell to be encoded, i.e. $K=J_1 \times K_L + J_2 \times K_L'$, and R corresponds to the resulting efficiency, i.e. R=K/N. The Byte+ column corresponds to the number of bytes added to the header compared with the basic configuration having 5 bytes.

Configuration 1 corresponds to that shown in FIG. 4. Configuration 2 corresponds to that obtained by adding 2 bytes to the header, and configuration 3 to that obtained by adding 5 bytes to the header.

It is desirable to add such bytes when it is desired to transmit a certain amount of additional information together with the ATM cell, e.g. data relating to link monitoring, to signalling, or to additional CRC encoding.

Naturally, the terminology "row code" and "column code" is not restrictive, i.e. two column codes could be applied in succession before applying a row code to the set of encoded data and the same result can be obtained, i.e. better protection of the header. This amounts to interchanging rows and columns. The essential point is thus to apply two first encoding operations followed by a third encoding operation in a direction that is orthogonal to the first two.

In an advantageous implementation, provision is made for the rows to be interlaced before applying column encoding (step c). If two column codes are applied before row encoding, then interlacing should be applied to the columns before applying a row code. Such interlacing makes it possible to simplify decoding the column code because decoding the line code of the header provides decisions that are more reliable. Bits that are decided on with a high degree of reliability can be considered as fixed in the words of the column code.

What is claimed is:

1. A method of encoding a data block comprising first and second data zones, said method comprising:

(a) encoding said first data zone using a first block encoding;

(b) encoding said second data zone using a second block encoding; and (c) encoding the data obtained from steps (a) and (b) using a third block encoding in a direction orthogonal to the first and second encodings, wherein said first block encoding is more powerful than said second block encoding so that said first data zone is more protected than said second data zone.

2. A method according to claim 1, wherein said step (c) further comprises interlacing said data obtained from said steps (a) and (b) prior to encoding the data obtained from said step (a) and (b) using said third block encoding.

3. A method according to claim 1, wherein said first block encoding is a sub-code of said second block encoding.

4. A method according to claim 1, wherein said data block comprises an ATM cell, said first data zone comprises a header of said ATM cell, and said second data zone comprises a payload data field of said ATM cell.

5. A method according to claim 1, wherein said first, second, and third block encodings are performed using Bode-Chaudhuri-Hocquenghem (BCH) codes of length n and dimension k, said BCH codes belonging to any one of the following families: (n, k), (n, k−1), (n+1, k), (n−s, k−s), or (n−s, k−1−s), and (n+1−s, k−s), where k, n, and s are integers with s<k.

6. A method according to claim 1, wherein said first and second encodings each comprise a row code and said third block encoding comprises a column code.

7. A method according to claim 1, wherein said first and second encodings each comprise a column code and said third block encoding comprises a row code.

* * * * *